United States Patent
Shearer

(10) Patent No.: US 7,864,174 B2
(45) Date of Patent: Jan. 4, 2011

(54) METHODS AND SYSTEMS FOR REDUCING THE NUMBER OF RAYS PASSED BETWEEN PROCESSING ELEMENTS IN A DISTRIBUTED RAY TRACING SYSTEM

(75) Inventor: Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 11/466,777

(22) Filed: Aug. 24, 2006

(65) Prior Publication Data

US 2008/0049017 A1 Feb. 28, 2008

(51) Int. Cl.
*G06T 15/40* (2006.01)
(52) U.S. Cl. ......................... 345/421; 345/426; 345/502
(58) Field of Classification Search ................. 345/421, 345/426, 502
See application file for complete search history.

(56) References Cited

U.S. PATENT DOCUMENTS

| | | | |
|---|---|---|---|
| 5,355,442 A * | 10/1994 | Paglieroni et al. | 345/427 |
| 6,556,200 B1 * | 4/2003 | Pfister et al. | 345/426 |
| 6,597,359 B1 * | 7/2003 | Lathrop | 345/440 |
| 6,603,484 B1 * | 8/2003 | Frisken et al. | 345/622 |
| 7,012,604 B1 * | 3/2006 | Christie et al. | 345/426 |
| 7,439,973 B2 * | 10/2008 | Fossum et al. | 345/422 |
| 2002/0113787 A1 * | 8/2002 | Ray et al. | 345/424 |
| 2004/0243364 A1 * | 12/2004 | Wendelin et al. | 703/2 |
| 2005/0243084 A1 * | 11/2005 | Smith et al. | 345/419 |
| 2006/0066607 A1 * | 3/2006 | Schmittler et al. | 345/419 |

* cited by examiner

*Primary Examiner*—Xiao M Wu
*Assistant Examiner*—Maurice McDowell, Jr.
(74) *Attorney, Agent, or Firm*—Patterson & Sheridan, LLP

(57) ABSTRACT

Embodiments of the invention provide techniques and systems for reducing network traffic in relation to ray-tracing a three dimensional scene. According to one embodiment of the invention, as a ray is traversed through a spatial index, a leaf node may be reached. Subsequent rays that traverse through the spatial index may reach the same leaf node. In contrast to sending information defining a ray issued by the workload manager to a vector throughput engine each time a ray reaches a leaf node, the workload manager may determine if a series of rays reach the same leaf node and send information defining the series of rays to the vector throughput engine. Thus, network traffic may be reduced by sending information which defines a series of rays which are traversed to a common (i.e., the same) leaf node in contrast to sending information each time a ray is traversed to a leaf node.

20 Claims, 10 Drawing Sheets

METHODS AND SYSTEMS FOR REDUCING THE NUMBER OF RAYS PASSED BETWEEN PROCESSING ELEMENTS IN A DISTRIBUTED RAY TRACING SYSTEM

BACKGROUND OF THE INVENTION

1. Field of the Invention

Embodiments of the invention generally relate to the field of image processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of reducing traffic on a communications network in a ray-tracing image processing system is provided. The method generally comprising: issuing a first ray into a three dimensional scene; with a first processing element, traversing a spatial index having nodes defining bounded volumes of the three dimensional scene with the new ray until a first leaf node is reached; comparing the first leaf node with a second leaf node stored in a data buffer, wherein the second leaf node was reached when traversing the spatial index with the first processing element for a previously issued ray; if the first leaf node and the second leaf node are the same leaf node, incrementing a counter value indicating a number of rays traversed to the first leaf node; and if the first leaf node and the second leaf node are not the same, sending information stored in the data buffer over the communications network to a second processing element to determine if primitives contained within a bounding volume defined by the second leaf node are intersected by the previously issued ray.

According to another embodiment of the invention a method of reducing traffic on a communications network in a ray-tracing image processing system is provided. The method generally comprising: with a first processing element, issuing a plurality of rays into a three dimensional scene, determining a first set of rays intersect a common leaf node; and via the communications network, sending information defining the first set of rays and information defining the common leaf node to a second processing element.

According to another embodiment of the invention an image processing system is provided. The image processing system generally comprising: a vector throughput engine; a communications network; and a workload manager. The workload manager generally configured to perform the steps comprising: issuing a plurality of rays into a three dimensional scene, determining a first set of rays intersect a common leaf node; and via the communications network, sending information defining the first set of rays and information defining the common leaf node to the vector throughput engine.

DETAILED DESCRIPTION OF THE PREFERRED EMBODIMENTS

Figure 1:
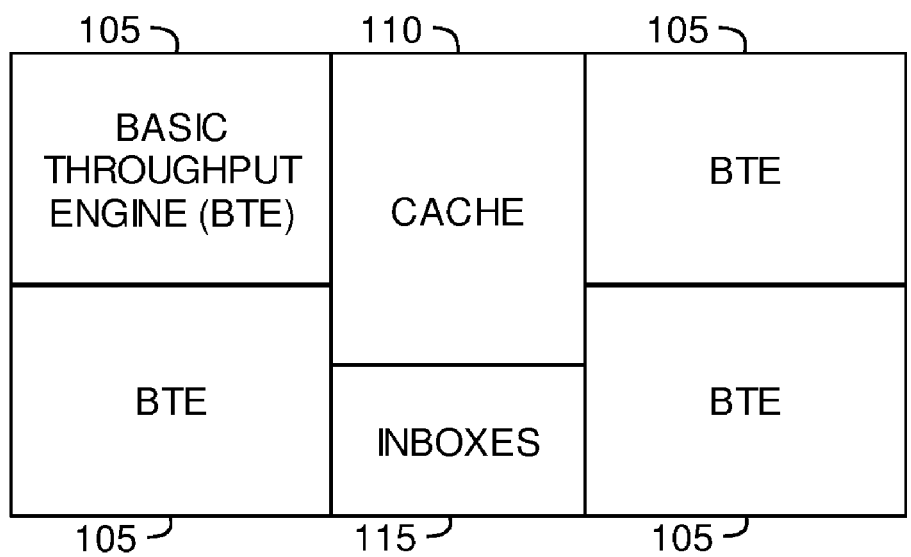
FIG. 1 illustrates a multiple core processing element, according to one embodiment of the invention.

Embodiments of the invention provide methods and apparatus for reducing traffic on an image processing system communications network. According to embodiments of the invention, a first processing element (e.g., a workload manager) may use a spatial index to trace a first ray through a three dimensional scene until a leaf node is reached. Once the first processing element reaches a leaf node in the spatial index, the first processing element may store information which defines the first ray and the leaf node (e.g., ray trajectory, leaf node identification, etc.) in a buffer. Next, the first processing element may traverse the spatial index with a second ray. If the first processing element traverses to the same leaf node with the second ray as was traversed to with the first ray, the first processing element may update a counter which indicates how many rays in a series of rays hit the same (common) leaf node. The workload manager may continue to issue new rays and update the counter until a ray strikes a different leaf node within the spatial index.

Once a subsequent ray strikes a different leaf node, the workload manager may send the information stored in the buffer and the counter value via a communications network (e.g., a memory mapped network of inboxes) to a second processing element (e.g., a vector throughput engine). After receiving the data from the first processing element, the second processing element may determine, based on the buffer information, a pattern of issuing rays into the three dimensional scene, and the counter, if any of the rays in the series of rays intersect primitives contained within a bounding volume which corresponds to the common leaf node. Therefore, in contrast to a ray tracing system which may send information from a first processing element to a second processing element each time a ray intersects a leaf node, information may only be sent when rays strike different leaf nodes. Therefore, the amount of information transmitted from the first processing element to the second processing element is reduced, and the number of transmissions from the first processing element to the second processing element is reduced. This reduction in transmission size and frequency may improve performance of an image processing system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
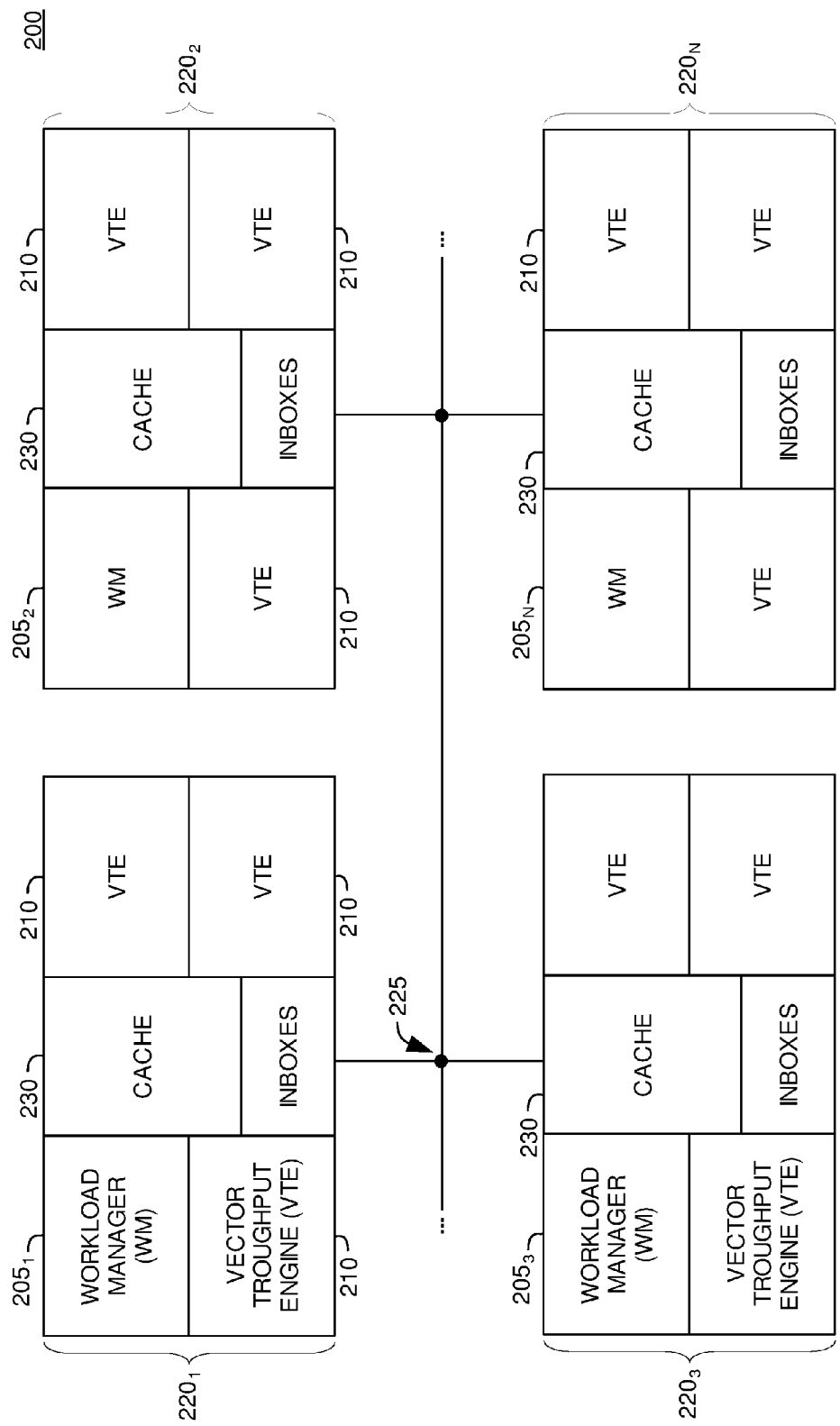
FIG. 2 illustrates multiple core processing element network, according to one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

An Exemplary Three Dimensional Scene

Figure 3:
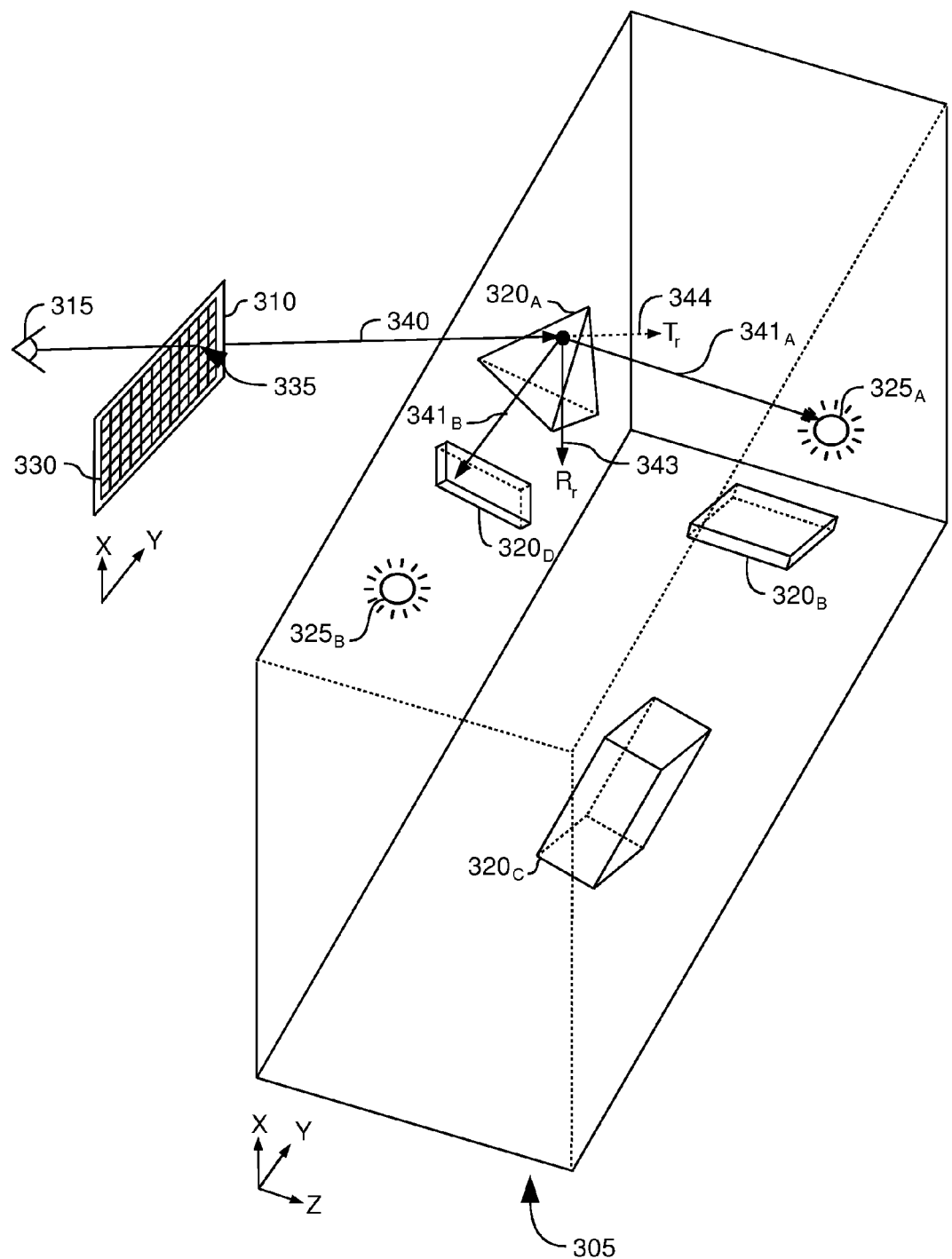
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two-dimensional picture on the monitor 310. An image processing system using a ray tracing image processing methodology to render a two dimensional picture from a three-dimensional scene 305 will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 340 may strike objects. As the rays strike objects within the scene the color of the object may be assigned the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary KD-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray-primitive intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
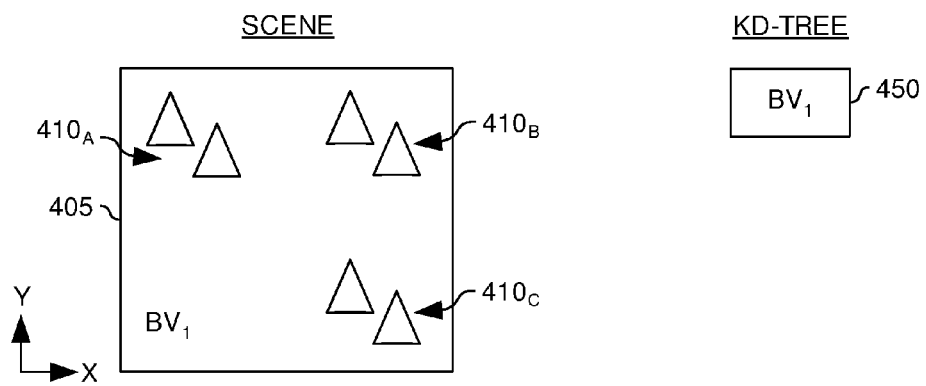
FIGS. 4A-4C illustrate a two dimensional space to be rendered by an image processing system and a corresponding spatial index created by an image processing system, according to one embodiment of the invention.
Figure 4B:
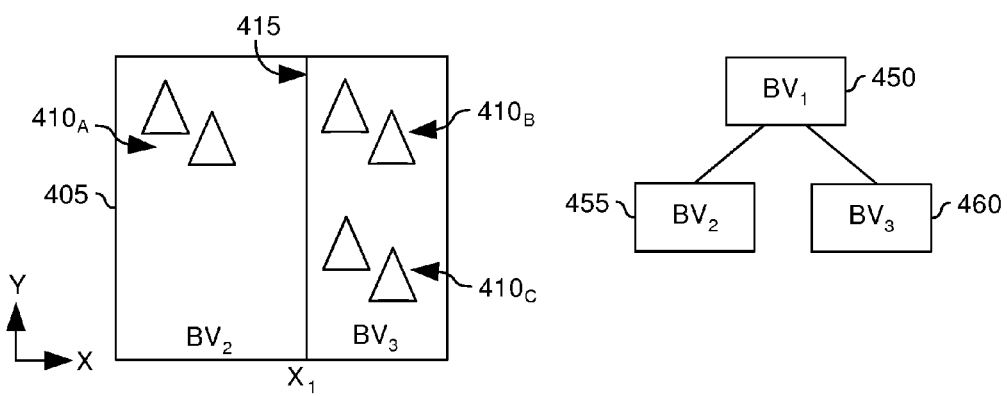
Figure 4C:
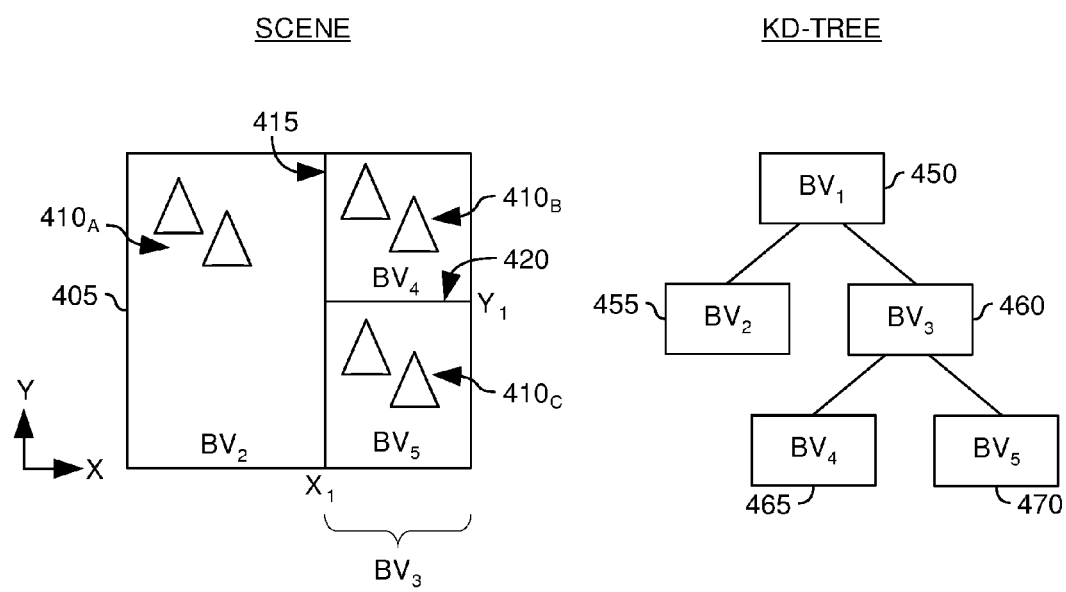

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C, splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$ and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Reducing Communications Traffic in a Ray Tracing Image Processing System

As previously described with respect to FIG. 4C, a ray tracing image processing system may use the workload manager 205 with a plurality of processing threads to traverse a spatial index. The workload manager 205 may use information which defines a ray (e.g., the trajectory of the ray) to traverse the spatial index. To traverse the spatial index the workload manager 205 may take branches to nodes corresponding to bounding volumes intersected by the ray. Once the workload manager 205 has traversed the spatial index until a leaf node has been reached, the workload manager 205 may send the ray (e.g., information defining the ray) and the traversed to leaf node (e.g., information defining the leaf node) to the vector throughput engine 210.

As described with reference to FIGS. 1 and 2, the workload manager 205 and the vector throughput engine 210 may communicate, for example, via a memory mapped network of inboxes (i.e., a communications network). After the ray has been sent from the workload manager 205 to the vector throughput engine 210, the vector throughput engine 210 may determine if the ray strikes any objects (primitives) contained within the bounding volume corresponding to the leaf node. Using the trajectory of the ray, the vector throughput engine 210 may determine if the ray strikes primitives by executing ray-primitive intersection tests. After determining if the ray strikes any primitives within the bounding volume, the vector throughput engine 210 may perform additional operations to determine a color to assign to the pixel through which the ray passed. Furthermore, the vector throughput engine 210 may issue secondary rays to determine additional color contributions to assign to the pixel (e.g., from other objects in the three dimensional scene).

If the workload manager 205 sends information to the vector throughput engine 210 each time a ray reaches a leaf node, a large amount of information (traffic) may flow across the communications network. In certain circumstances (e.g., a large number of rays being traced and assigned to a particular workload manager 205), this amount of traffic may slow the image processing system such that the image processing system may be unable to render a two dimensional image from a three dimensional scene in an acceptable amount of time. For some embodiments, techniques to reduce the amount of information sent across the communications network may be applied in such circumstances.

For example, according to one embodiment of the invention, instead of sending the ray information from the workload manager to the vector throughput engine each time a ray reaches a leaf node, the workload manager may employ a data buffer to store information relating to a series of rays which reach the same (a common) leaf node. The workload manager may send the information stored in the data buffer when a subsequent ray reaches a different leaf node rather than sending ray/leaf node information across the communication network each time a ray is reaches the common leaf node. By sending information which defines a series of rays which reach a common leaf node to the vector throughput engine 210 instead of sending ray information every time a ray reaches a common leaf node, the amount of information sent across the communications network may be reduced.

The information stored in the data buffer by the workload manager 205 may define a series of rays which have been traversed to a common leaf node by the workload manager 205. The information necessary to define a series of rays may be smaller than the information which defines each individual ray in a series of rays (e.g., the trajectory of each individual ray). However, the information which defines each ray (e.g., the trajectory of each individual ray) may be derived from the information which defines a series or rays. For example, the image processing system may follow a predefined pattern for issuing rays to be traversed by the workload manager. Based on the pattern and the information which defines the series of rays which reach a common leaf node, the information which defines each individual ray (e.g., the trajectory of each ray) may be derived by the vector throughput engine 210.

For example, the information which defines a series of rays which reach a common leaf node may be the trajectory of a first ray in the series of rays, the number of rays in the series of rays, and information which defines the common leaf node. If the vector throughput engine 210 knows the pattern which the image processing system has used to issue the rays, the trajectory of the first ray and the number of rays which are in the series of rays which reach a common leaf node may be sufficient to calculate the trajectory of each ray in the series of rays. The trajectory of each ray may then be used to determine if the rays in the series of rays intersect primitives contained within the bounding volume corresponding to the leaf node. One example of a pattern which may be used by the image processing system to issue rays is described below with reference to FIG. 7.

Another example of the recorded information which defines a series of rays which reach a common leaf node may be the trajectory of a first ray in the series and the trajectory of the last ray in the series or rays, and information which defines the common leaf node. Based on the pattern the image processing system follows to issue rays and the trajectory of the first ray and the last ray in the series, the vector throughput engine 210 may be able to calculate the trajectory of each ray in the series of rays which reach a common leaf node.

An example of the data transmission savings when sending information which defines a series of rays which are traversed to a common leaf node in contrast to sending information which defines each ray which is traversed to a common leaf node is as follows. A workload manager 205 may need 32 bytes of information to define a ray and a leaf node the workload manager 205 reached when traversing the spatial index with the ray. Therefore, when the workload manager 205 may send 32 bytes of data to a vector throughput engine 210 for ray-primitive intersection tests. If a series of three consecutive rays reach the same (common) leaf node, and the workload manager sends information which defines each ray/leaf node to the vector throughput engine each time a ray reaches a leaf node, a workload manager 205 may send 96 bytes (32 bytes×3 rays) of data to the vector throughput engine 210.

If the vector throughput engine knows a predefined relationship between the rays, full information defining each ray in the series of rays may not be necessary. For example, the predefined relationship between the rays may be a pattern which the image processing system follows to issue rays into a three dimensional scene as discussed further below with respect to FIG. 7.

In contrast, by sending only information which defines the series of rays which reach a common leaf node, network bandwidth may be conserved. For example, as is the case when not sending a series of rays, the information necessary to define the first ray and the leaf node which was traversed to with the ray may be 32 bytes long. Furthermore, a counter value which indicates how many rays in the series of rays which reach the same (common) leaf node may be one byte long (only one byte necessary to represent the number of rays which intersect the common leaf node (3)). Thus, only 33 bytes of information (33 bytes=32 bytes+1 byte) would be necessary to transmit the information defining the series of three rays to the vector throughput engine 210. The vector throughput engine may then use the information which defines the first ray to the vector throughput engine 210 and the known pattern the image processing system uses to issue rays to calculate the trajectory of the other two rays in the series of rays which are traversed to the common leaf node. Therefore, with respect to this example, the amount of information sent across the communications network is reduced by 63 bytes (96 bytes−33 bytes=63 bytes).

According to some embodiments of the invention, the counter value may be transmitted from the workload manager 205 to the vector throughput engine 210 in a packet of information which defines the series of rays. The packet of information may be the same size when transmitting information which defines a single ray which intersected a leaf node as when transmitting information which defines a series of rays which intersect a common leaf node. Therefore, sending the counter value may not require extra bits.

An Exemplary Communications Traffic Reduction Algorithm

Figure 5:
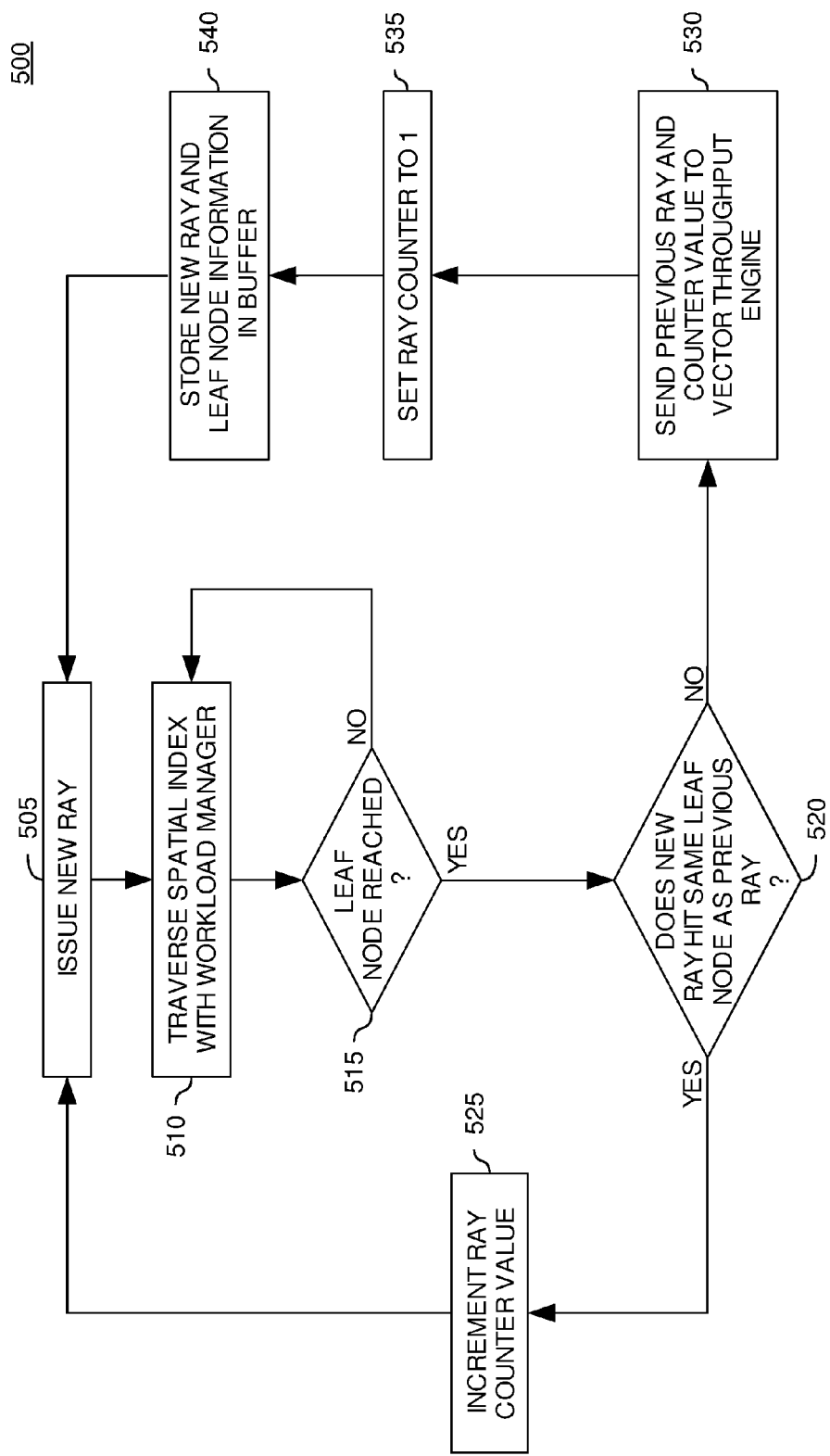
FIG. 5 is a flowchart which illustrates a method for reducing the amount of information sent across an image processing system communications network, according to one embodiment of the invention.

FIG. 5 illustrates one method 500 of reducing the amount of information sent across a communications network in an image processing system, according to one embodiment of the invention. As described above, the method 500 may send information which defines a series of rays which reach a common leaf node to a vector throughput engine.

The method 500 begins at step 505 when the image processing system issues a new ray into a three dimensional scene. Next, at step 510, the workload manager 205 may traverse the spatial index with the new ray by performing ray-bounding volume intersection tests to determine branches to take to nodes which represent bounding volumes intersected by the new ray.

Each time a workload manager 205 takes a branch to a node, the workload manager 205 may determine, at step 515, whether or not the node traversed to is a leaf node. If the workload manager 205 has not reached a leaf node, the workload manager 205 may return to step 510 to continue traversing the spatial index. Thus, the workload manager continues to traverse the spatial index until a leaf node is reached. If a leaf node is reached, the workload manager 205 may proceed to step 520.

At step 520 the workload manager 205 may determine if the leaf node which has been traversed to with the new ray is the same as a leaf node traversed to with a previous ray. Information defining the previous ray (e.g., ray trajectory information) and information defining the previously reached leaf node may have been previously stored in a data buffer. The data buffer may be located, for example, within the workload manager (e.g., in workload manager cache memory). A counter value may also be stored in the data buffer, and may represent the number of rays in a series of rays which are traversed to (reach) the same leaf node of the spatial index.

The workload manager 205 may compare the leaf node which the new ray intersects with the information stored in the buffer (i.e., the leaf node the previous ray intersected). If the workload manager determines that it traversed the new ray to the same leaf node the previous ray was traversed to, the workload manager may increment the value of the counter in step 525. After incrementing the counter value the workload manager may proceed to step 505 where the workload manager may issue a new ray for traversal.

However, if a determination is made in step 520 that the leaf node which has been traversed to with the new ray is not the same as a leaf node traversed to with a previous ray, the workload manager may proceed to step 530. At step 530 the workload manager may send (via the communications network) the information stored in the data buffer to a vector throughput engine 210. The previous ray stored in the buffer and the counter value may represent a series of rays which reach the common leaf node, or it may only represent a single ray which did not reach a common leaf node. As described below with respect to FIG. 6, the vector throughput engine 210 may then perform operations to determine if the ray or rays sent from the workload manager 205 intersect primitives contained within the bounding volumes which correspond to the traversed to leaf nodes.

After the workload manager 205 has sent the information stored in the buffer to the vector throughput engine 210, the workload manager may proceed to step 535 where the workload manager may set the counter value to 1. This action represents that the new ray may be the first in what may be a series of rays which reach the same leaf node.

Next, at step 540 the workload manager may store, in the data buffer, information which defines the new ray and information which defines the leaf node traversed to with the new ray. Step 540 ensures that the workload manager will be able to compare subsequently issued rays and the nodes they reached with the new ray. After the workload manager 205 is finished storing the new ray and the leaf node information into the data buffer, the workload manager 205 may return to step 505 where the workload manager 205 may issue a new (subsequent) ray to traverse through the spatial index.

Figure 6:
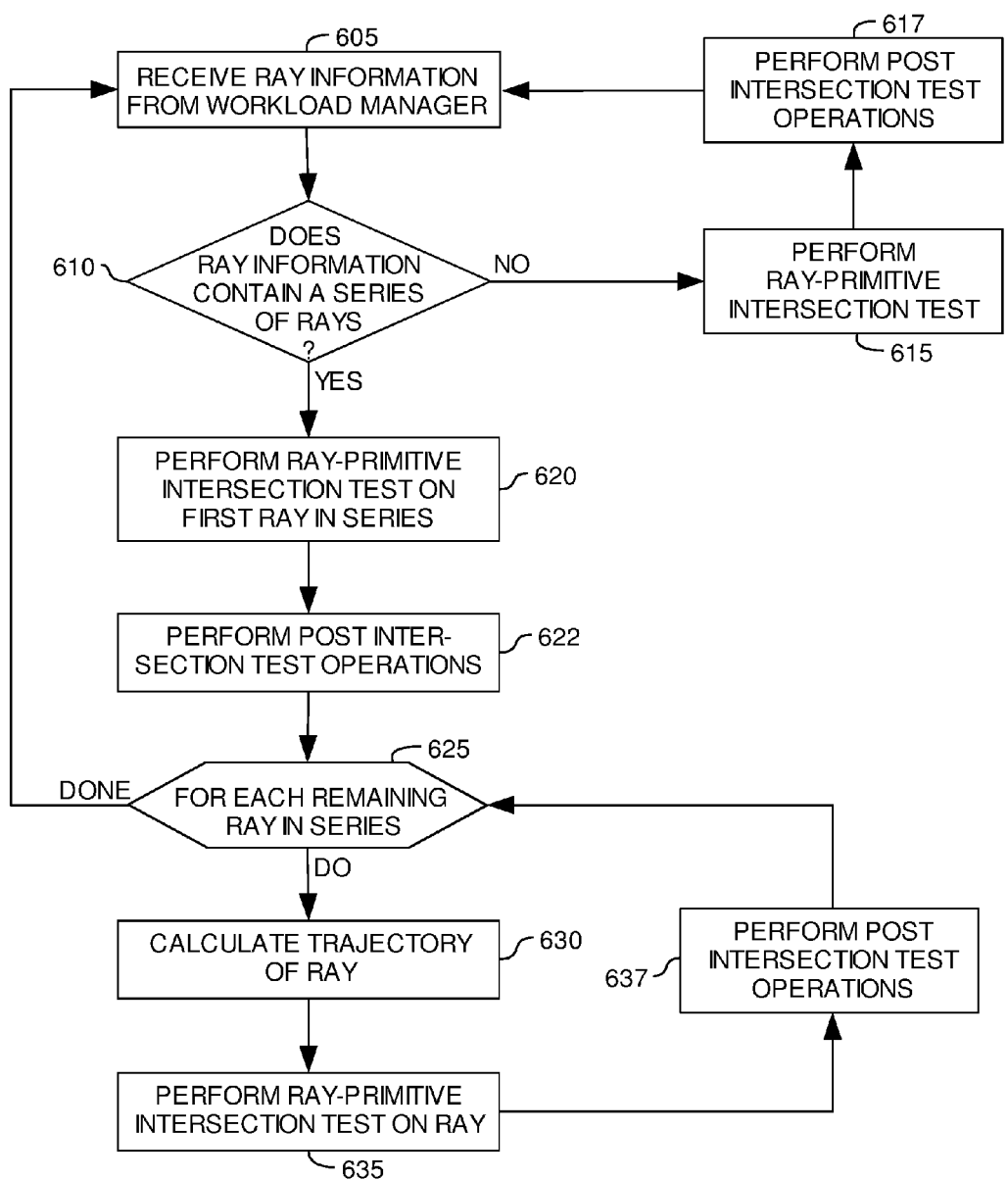
FIG. 6 is a flowchart which illustrates a method for traversing a spatial index, according to one embodiment of the invention.

After the workload manager 205 has sent information via the communications network (in step 530), the vector throughput engine 210 may determine if the received ray or rays intersect any primitives contained within bounding volumes corresponding to the leaf nodes. FIG. 6 illustrates a method 600 of determining if rays intersect primitives contained within bounding volumes corresponding to leaf nodes, according to one embodiment of the invention.

The method 600 begins at step 605, for example, when a vector throughput engine 210 receives information from the workload manager 205. More specifically, the method 600 beings when the vector throughput engine 210 receives from the workload manager 205 information which defines a ray or rays which have been traversed to a leaf node of a spatial index.

Next, at step 610, the vector throughput engine 210 may determine if the information received from the workload manager 205 contains information which defines a series of rays or a single ray. This may be accomplished, for example, by examining the received information for a counter value. If the counter value is equal to one, the information defines only a single ray, and the vector throughput engine may proceed to step 615.

At step 615 the vector throughput engine 210 may use the information received from the workload manager 205 (e.g., information defining the traversed to leaf node and information defining the trajectory of the ray) to determine if the ray intersects a primitive contained within the bounding volume corresponding to the traversed to leaf node. After the intersection test (or tests) has been completed, the vector throughput engine 210 may proceed to step 617 where post intersection operations may be performed.

Post intersection test operations may include, for example, assigning a color to a pixel through which the ray passed. Post intersection test operations may also include sending information relating to the pixel (e.g., pixel color) or the ray, via the communications network, to the workload manager 205. After step 617, the vector throughput engine 210 may return to step 605 to receive more information from the workload manager 205.

If however, at step 610, the vector throughput engine 210 determines that the information received from the workload manager 205 defines a series of rays, the vector throughput engine 210 may proceed to step 620. The vector throughput engine 210 may determine if the information received from the workload manager 205 defines a series of rays by observing the counter value contained within the information. For example, if the counter value is greater than one, the information defines a series of rays.

Next, at step 620, the vector throughput engine 210 may use the received information (e.g., information defining the first ray and the traversed to leaf node) to determine if the first ray in the series of rays intersected any primitives contained within the bounding volume corresponding to the common leaf node (common to the series of rays). This may be accomplished using the trajectory of the first ray and the position of the primitives contained within the bounding volume. After step 620, the vector throughput engine 210 may proceed to step 622 where post intersection operations may be performed (e.g., assigning a color to a pixel, communications with the workload manager 205, etc.).

Next, the vector throughput engine 210 may commence a loop 625 to run ray-primitive intersection tests on the remaining rays in the series of rays which reached the same (common) leaf node. The loop commenced at step 625 may repeat for each ray that remains in the series of rays. The vector throughput engine 205 may subtract one from the counter value to determine how many times to iterate the loop, thus taking into consideration that the vector throughput engine may have already executed ray-primitive intersection tests based on the information defining the first ray in step 615.

According to one embodiment of the invention, the information sent by the workload manager 205 may only contain information defining the trajectory of the first ray in the series of rays, information defining the common leaf node, and the counter value.

Due to the fact that the workload manager 205 may have only sent information which defined the first ray and the counter value, the first step in the loop, step 630, may exist to calculate the trajectory of a subsequent ray in the series of rays. In order to calculate the trajectory of a subsequent ray in the series of rays, two points in space are needed. As illustrated in FIG. 3, the first point may be the location of viewer 315. A second point which may be used to calculate the trajectory of a subsequent ray may be the location of the pixel 335 through which the subsequent ray passes.

The vector throughput engine 210 may calculate the second point by knowing a pattern which the image processing system may use to issue rays into the three dimensional scene 305, and thus to the workload manager 205. A pattern which may be used by the image processing system is discussed further below with respect to FIG. 7.

Using the trajectory of the first ray in the series of rays the vector throughput engine may calculate which pixel the first ray passed. Based on the pixel value through which the first ray in the series of rays passed, the pattern or sequence in which the image processing system issues rays, and the number of rays after the first ray in the series of rays the trajectory is being calculated for, the vector throughput engine may calculate the pixel through which the subsequent ray passed. Knowing the coordinates of the pixel through which the subsequent ray passed and the coordinates of the origin of the ray (i.e., the location of the viewer 315), the trajectory of the subsequent ray may be calculated. Calculating the trajectory of a subsequent ray based on two points may be accomplished by any means known to those skilled in the art.

Figure 7:
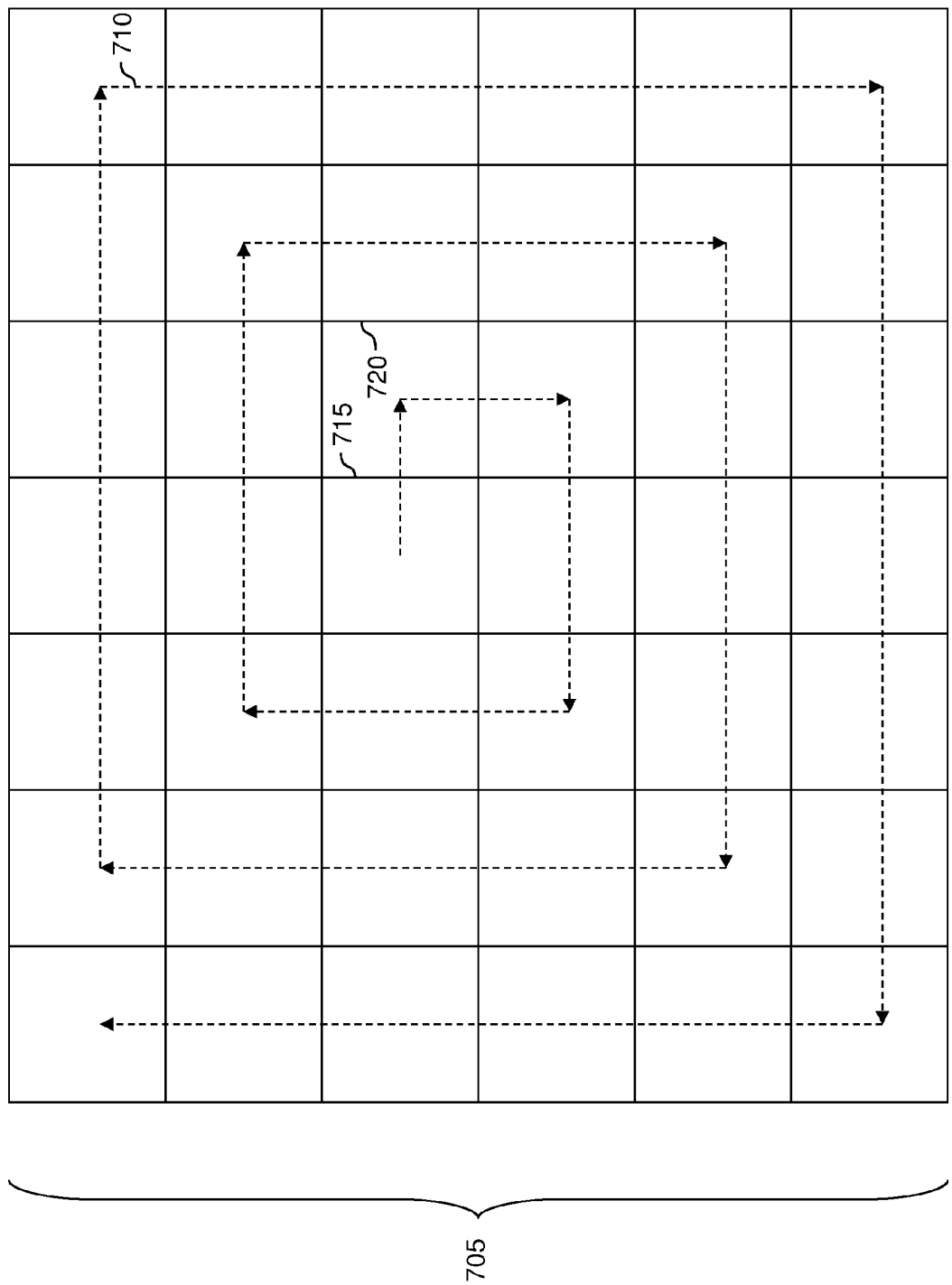
FIG. 7 illustrates an exemplary pattern for issuing rays into a three dimensional scene, according to one embodiment of the invention.

As briefly mentioned above, FIG. 7 illustrates an exemplary pattern 710 which an image processing system may follow to issue rays into a three dimensional scene (e.g., the three dimensional scene 305 of FIG. 3), according to one embodiment of the invention. FIG. 7 illustrates a grid of pixels 705 which may make up a portion of a much larger monitor 310. The exemplary pattern 710 which an image processing system may follow in issuing rays into a portion of a three dimensional scene 305 is illustrated by the dashed arrow lines flowing throughout the grid of pixels 705. The pattern 710 starts at the center most pixel 715 and moves outwardly in a concentric pattern. Thus, an image processing system which may issue a single ray into the three dimensional scene 305 for each pixel may issue the first ray into the three dimensional scene 305 through the center most pixel 715. Next the image processing system following the pattern 710 illustrated in FIG. 7 may issue a second ray through the pixel immediately to the right of the center most pixel (i.e., pixel 720). The image processing system may continue to issue one ray per pixel along the dashed line representing the pattern 710 until the image processing system has issued one ray per pixel for every pixel in the monitor 310. Moreover, in other embodiments of the invention the image processing system may issue a different number of rays per pixel, or may follow a different pattern.

After the vector throughput engine 210 has calculated the trajectory of the subsequent ray, at step 635 the vector throughput engine 210 may perform ray-primitive intersection tests on the subsequent ray to determine if the subsequent ray hit any primitives within the bounding volume corresponding to the common leaf node which series of rays intersected. After the ray-primitive intersection tests are complete the vector throughput engine 210 may proceed to step 637. At step 637 the vector throughput engine may perform post intersection operations (e.g., assign a color to the pixel through which the ray passed, communication with the workload manager 205, etc.). After the post intersection tests are complete, the vector throughput engine 210 may return to repeat the loop 625 for every other ray in the series of rays which intersected the common leaf node. After the loop 625 is finished the vector throughput engine 210 may return to step 605 to receive more ray information from the workload manager 205.

Exemplary Rays Striking a Common Leaf Node/Bounding Volume

Figure 8:
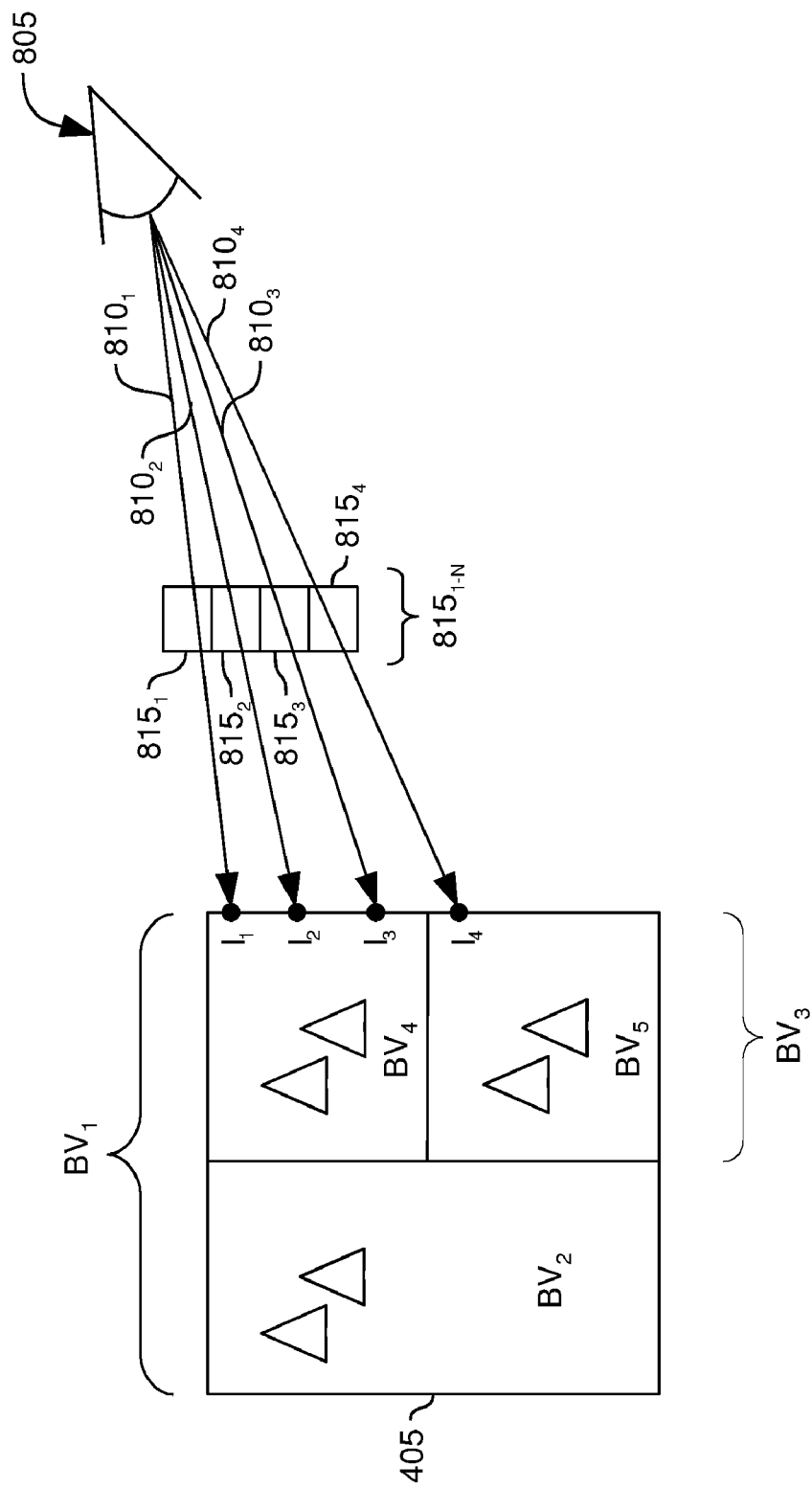
FIG. 8 illustrates rays being issued into an exemplary three dimensional scene, according to one embodiment of the invention.

FIG. 8 illustrates exemplary rays issued from an image processing system into a three dimensional scene 405, according to one embodiment of the invention. For clarity, the three dimensional scene 405 is the same as the three dimensional scene used in FIGS. 4A-4C to illustrate the construction of a kd-tree. Therefore, the kd-tree which corresponds to the three dimensional scene 405 is the same as the kd-tree which was constructed with regards FIGS. 4A-4C. As illustrated in FIG. 8, a viewer 805 represents the origin of a plurality of rays $810_{1-4}$ which may be issued into the three dimensional scene 405 by the image processing system. As each ray 810 is issued into the three dimensional scene, the rays may first pass through a corresponding pixel in a grid of pixels 815. Although only four pixels 815 and four rays 810 are illustrated in FIG. 8, to render a final two dimensional image from a three dimensional scene many more pixels may be necessary, and many more rays may be issued.

A first ray $810_1$ may be issued by the image processing system and pass through a first pixel $815_1$. The first ray $810_1$ may intersect bounding volume 4 ($BV_4$) at an intersection point $I_1$. To facilitate understanding, the image processing system in this example may follow a pattern of issuing rays starting from the top of the grid of pixels 815 and continue issuing rays, one ray per pixel, moving down the grid of pixels until a ray has been issued for each pixel in the grid of pixels.

A second ray $810_2$ and a third ray $810_3$ may also be issued by the image processing system which may pass through a second pixel $815_2$ and a third pixel $815_3$ respectively. The second ray and the third ray may also intersect $BV_4$ at a second intersection point $I_2$ and a third intersection point $I_3$ respectively. Thus the first ray $810_1$, the second ray $810_2$, and the third ray $810_3$ all intersect the same bounding volume which, as illustrated later with respect to FIG. 9, will all intersect the same (common) leaf node corresponding to $BV_4$.

Furthermore, a fourth ray $810_4$ may be issued by the image processing system and may pass through a fourth pixel $815_4$. The fourth ray $810_4$, in contrast to the first three rays $810_{1-3}$, may intersect bounding volume 5 ($BV_5$) at intersection point $I_4$.

Figure 9:
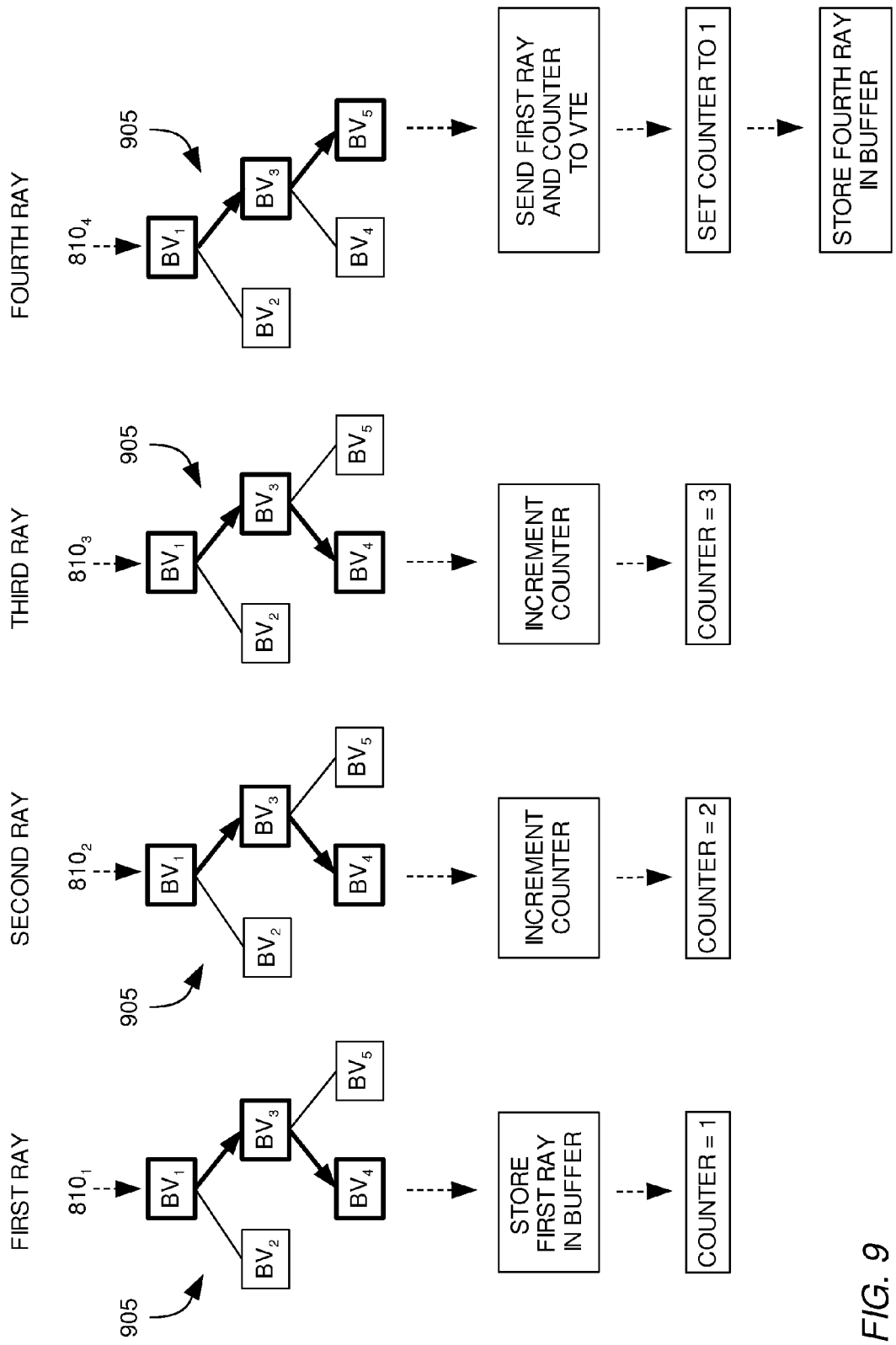
FIG. 9 illustrates exemplary traversal of rays through a spatial index, according to one embodiment of the invention.

This is illustrated in FIG. 9, which shows exemplary traversal of rays by the workload manager 205 through a kd-tree 905, according to one embodiment of the invention. The kd-tree 905 in FIG. 9 corresponds to the three dimensional scene 405 illustrated in FIG. 8.

After the image processing system issues the first ray $810_1$, the workload manager 205 may traverse the ray through the kd-tree 905 until it reaches a leaf node which corresponds to $BV_4$ (the bounding volume which the first ray $810_1$ struck at intersection point $I_1$).

After the workload manger 205 reaches the leaf node (e.g., the leaf node corresponding to $BV_4$) it may store the ray information and leaf node information in a data buffer as described earlier in step 540 of method 500. The workload manger 205 may also set the counter value to one, which represents the fact that the first ray $810_1$ may be the first in a series of rays which are traversed to a common leaf node.

Next the image processing system may issue the second ray $810_2$, and the workload manager 205 may traverse the second ray $810_2$ through the kd-tree 905 until it reaches a leaf node. Similar to the traversal of the first ray $810_1$, the workload manager will also traverse the second ray $810_2$ to the leaf node which corresponds to $BV_4$ because the second ray also intersects $BV_4$. By comparing the leaf node reached by the second ray $810_2$ with the leaf node stored in the buffer (i.e., the leaf node traversed to with the first ray $810_1$), the workload manager 205 may determine that the second ray $810_2$ reaches the same leaf node as the first ray $810_1$. Consequently, instead of sending the ray information to the vector throughput engine 210, the workload manager 205 may increment the counter value, from one to two, to represent the fact that two rays (i.e., the first ray $810_1$ and the second ray $810_2$) reach the same (common) leaf node (i.e., $BV_4$).

Next the image processing system may issue the third ray $810_3$, and the workload manager 205 may traverse the third ray $810_3$ through the kd-tree 905 until it reaches a leaf node. Similar to the traversal of the first ray $810_1$ and the second ray $810_2$, the workload manager 205 will traverse the third ray $810_3$ to the leaf node which corresponds to $BV_4$. By comparing the leaf node reached with the third ray $810_3$ with the leaf node stored in the buffer (i.e., the leaf node reached with the first ray $810_1$), the workload manager 205 may determine that the third ray $810_3$ reaches the same leaf node as the first ray $810_1$. Consequently, instead of sending the ray information to the vector throughput engine 210, the workload manager 205 may increment the counter value, from two to three, to represent the fact that three rays (i.e., the first ray $810_1$, the second ray $810_2$, and the third ray $810_3$) reach the same leaf node (i.e., $BV_4$).

Next the image processing system may issue the fourth ray $810_4$, and the workload manager may traverse the fourth ray $810_4$ through the kd-tree 905 until it reaches a leaf node. However, as illustrated in FIG. 8, the fourth ray $810_4$ intersects $BV_5$ at intersection point 14. By comparing the leaf node traversed to with the fourth ray $810_4$ ($BV_5$) with the leaf node stored in the buffer (i.e., $BV_4$), the workload manager 205 may determine that the fourth ray $810_4$ reaches a different leaf node than the previous three rays ($810_1$, $810_2$, and $810_3$). In response to this determination, the workload manager 205 may send the information which defines the first ray $810_1$, the common leaf node (i.e., $BV_4$), and the counter value (3) to the vector throughput engine 210. Once the vector throughput engine receives the information, the vector throughput engine 210 may then perform operations to determine if the first ray $810_1$, the second ray $810_2$, and/or the third ray $810_3$ intersect any primitives contained within $BV_4$.

Furthermore, the workload manager may store information defining the fourth ray $810_4$ and the leaf node which the fourth ray reaches ($BV_4$) in the buffer such that subsequently traversed to leaf nodes compared with the leaf node which was traversed to with the fourth ray $810_4$ (i.e., $BV_5$).

Although described herein as a single buffer, other embodiments of the invention may comprise multiple buffers which store information defining multiple rays which are traversed to a plurality of common leaf nodes. Furthermore, although described as the workload manager comparing rays which were issued immediately following one another with no intervening issued rays, the workload manager may compare rays which were not issued immediately following one another according to embodiments of the invention.

CONCLUSION

Embodiments of the invention provide techniques and systems for reducing network traffic in relation to ray-tracing a three dimensional scene. According to one embodiment of the invention, as a ray is traversed through a spatial index, a leaf node may be reached. Subsequent rays that traverse through the spatial index may reach the same leaf node. In contrast to sending information defining a ray issued by the workload manager to a vector throughput engine each time a ray reaches a leaf node, the workload manager may determine if a series of rays reach the same leaf node and send information defining the series of rays to the vector throughput engine. Thus, network traffic may be reduced by sending information which defines a series of rays which are traversed to a common (i.e., the same) leaf node in contrast to sending information each time a ray is traversed to a leaf node.

While the foregoing is directed to embodiments of the present invention, other and further embodiments of the invention may be devised without departing from the basic scope thereof, and the scope thereof is determined by the claims that follow.

What is claimed is:

1. A method of reducing traffic on a communications network in a ray-tracing image processing system comprising:

issuing a first ray into a three dimensional scene;
with a first processing element, traversing a spatial index having nodes defining bounded volumes of the three dimensional scene with the first ray until a first leaf node is reached;
comparing the first leaf node with a second leaf node stored in a data buffer, wherein the second leaf node was reached when traversing the spatial index with the first processing element for a previously issued ray;
if the first leaf node and the second leaf node are the same leaf node, incrementing a counter value indicating a number of rays traversed to the first leaf node; and
if the first leaf node and the second leaf node are not the same, sending information stored in the data buffer over the communications network to a second processing element to determine if primitives contained within a bounding volume defined by the second leaf node are intersected by the previously issued ray.

2. The method of claim 1, wherein the information stored in the data buffer comprises:
information defining a trajectory of a previously issued ray;
information defining the second leaf node; and
the counter value.

3. The method of claim 1, wherein the first processing element and the second processing element are located on separate processing cores.

4. The method of claim 1, wherein the data buffer is located in a memory cache of the first processing element.

5. The method of claim 1, further comprising:
with the second processing element, determining if the information stored in the data buffer defines a series rays; and
if so, determining if the rays in the series of rays intersect primitives contained within a bounding volume corresponding to the first leaf node.

6. A method of reducing traffic on a communications network in a ray-tracing image processing system comprising:
with a first processing element, issuing a plurality of rays into a three dimensional scene;
determining whether a first set of rays intersect a common leaf node; and
via the communications network, sending information defining the first set of rays and information defining the common leaf node to a second processing element.

7. The method of claim 6, further comprising:
with the second processing element, determining if at least one ray in the first set of rays intersect at least one primitive contained within a bounding volume defined by the common leaf node.

8. The method of claim 6, wherein the information comprises:
the trajectory of at least one ray in the first set of rays;
information which defines the common leaf node; and
a counter value that identifies a number of rays in the first set of rays.

9. The method of claim 6, wherein the plurality of rays are issued into the three dimensional scene according to a pattern.

10. The method of claim 9, wherein the information comprises:
the trajectory of the first ray in the first set of rays;
information which defines the common leaf node; and
a counter value that identifies a number of rays in the first set of rays.

11. The method of claim 10, further comprising:
with the second processing element, determining if the first ray in the first set of rays intersects at least one primitive contained within a bounding volume defined by the common leaf node, and determining if at least one subsequent ray in the first set of rays intersects at least one primitive contained within the bounding volume defined by the common leaf node.

12. The method of claim 11, wherein the second processing element determines if at least one subsequent ray in the first set of rays intersects at least one primitive comprises:
calculating the trajectory of the subsequent ray based on a trajectory of the first ray, the counter value, and the pattern the plurality of rays are issued into the three dimensional scene.

13. The method of claim 6, wherein the first processing element and the second processing element are on different processing cores and the communications network comprises at least a memory mapped address space shared by the processing cores.

14. An image processing system, comprising:
a vector throughput engine;
a communications network; and
a workload manager configured to perform the steps comprising:
issuing a plurality of rays into a three dimensional scene;
determining whether a first set of rays intersect a common leaf node; and
via the communications network, sending information defining the first set of rays and information defining the common leaf node to the vector throughput engine.

15. The image processing system of claim 14, wherein the vector throughput engine is configured to:
determine if at least one ray in the first set of rays intersect at least one primitive contained within a bounding volume defined by the common leaf node.

16. The image processing system of claim 14, wherein the information comprises:
the trajectory of at least one ray in the first set of rays;
information which defines the common leaf node; and
a counter value that identifies a number of rays in the first set of rays.

17. The image processing system of claim 14, wherein the plurality of rays are issued into the three dimensional scene according to a pattern.

18. The image processing system of claim 17, wherein the information comprises:
the trajectory of the first ray in the first set of rays;
information which defines the common leaf node; and
a counter value that identifies a number of rays in the first set of rays.

19. The image processing system of claim 18, wherein the vector throughput engine is further configured to determine if the first ray in the first set of rays intersects at least one primitive contained within a bounding volume defined by the common leaf node, and determine if at least one subsequent ray in the first set of rays intersects at least one primitive contained within the bounding volume defined by the common leaf node.

20. The image processing system of claim 19, wherein the vector throughput engine determines if at least one subsequent ray in the first set of rays intersects at least one primitive comprises:
calculating the trajectory of the subsequent ray based on a trajectory of the first ray, the counter value, and the pattern the plurality of rays that are issued into the three dimensional scene.

* * * * *